United States Patent
Brown (10) Patent No.: US 11,072,063 B2
(45) Date of Patent: Jul. 27, 2021

(54) MALLEABLE COOKWARE HANDLE

(71) Applicant: Tamesha Brown, Compton, CA (US)

(72) Inventor: Tamesha Brown, Compton, CA (US)

( * ) Notice: Subject to any disclaimer, the term of this patent is extended or adjusted under 35 U.S.C. 154(b) by 0 days.

(21) Appl. No.: 16/252,302

(22) Filed: Jan. 18, 2019

(65) Prior Publication Data

US 2020/0230799 A1    Jul. 23, 2020

(51) Int. Cl.
*B25G 1/10* (2006.01)
*A47J 45/07* (2006.01)
*A47J 45/08* (2006.01)
*A47G 21/02* (2006.01)
*B26B 29/02* (2006.01)

(52) U.S. Cl.
CPC ............. *B25G 1/102* (2013.01); *A47G 21/02* (2013.01); *A47J 45/071* (2013.01); *A47J 45/085* (2013.01); *B26B 29/02* (2013.01); *A47G 2200/046* (2013.01); *A47G 2400/10* (2013.01)

(58) Field of Classification Search
CPC .... B25G 1/102; B25G 1/02; A47G 2200/046; A47J 45/071; A47J 45/085; A47J 45/08; A47J 45/00; A47J 45/06; A47J 45/061; A47J 45/07; A47J 45/10; B26B 29/02
See application file for complete search history.

(56) References Cited

U.S. PATENT DOCUMENTS

| | | | |
|---|---|---|---|
| 4,197,611 A | 4/1980 | Bell et al. | |
| 4,763,416 A * | 8/1988 | Copeland | A22B 5/168 30/123.5 |
| 5,056,945 A * | 10/1991 | Klodt | B43K 23/008 401/6 |
| 5,890,260 A * | 4/1999 | Gaunt | B25G 1/10 16/436 |
| 9,358,694 B1 | 6/2016 | Huemann et al. | |
| 2013/0061724 A1* | 3/2013 | Lin | B25G 1/102 81/489 |
| 2013/0192069 A1 | 8/2013 | Reibold | |
| 2013/0233863 A1* | 9/2013 | Lapine | B32B 37/153 220/573.1 |
| 2018/0220849 A1* | 8/2018 | Votolato | A47J 45/061 |

OTHER PUBLICATIONS

International Search Report and Written Opinion dated Apr. 23, 2020 for International Application No. PCT/US2020/014168, filed Jan. 17, 2020.

* cited by examiner

*Primary Examiner* — Don M Anderson
(74) *Attorney, Agent, or Firm* — Sheppard, Mullin, Richter & Hampton LLP (57) ABSTRACT

A malleable handle for use in conjunction with a cooking device (or integral to the cooking device) may include an outer surface adapted to conform to a user's hand(s) during use. A user may grasp the malleable handle with his/her hand(s) and the pressure from the user's grip may deform the malleable handle thereby creating an ergonomically-shaped handle customized to the user's hand(s).

17 Claims, 7 Drawing Sheets

MALLEABLE COOKWARE HANDLE

FIELD

Various embodiments relate generally to a cooking utensil or cookware handle. More particularly, various embodiments relate to an ergonomic, malleable handle that may be used to facilitate the use of cooking tools by children, and persons with limited muscle control or ability to grip objects securely.

BACKGROUND

Various embodiments relate generally to a cooking utensil or cookware handle. More particularly, various embodiments relate to an ergonomic, malleable handle that may be used to facilitate the use of cooking tools by children, and persons with limited muscle control or ability to grip objects securely.

SUMMARY

In accordance with one embodiment, a malleable handle for use in conjunction with a cooking device comprises an outer surface that upon use conforms to a user's hand to provide an ergonomically-shaped handle with which to manipulate the cooking device. The malleable handle further comprises an inner surface adapted to engagingly connect the handle to an existing handle of the cooking device, the inner surface defining an opening for accepting the existing handle of the cooking device.

In some embodiments, the malleable handle further comprises a handguard, the handguard being positioned between the user's hand and the cooking device during use.

In some embodiments, the malleable handle is at least one of removable and re-attachable to the existing handle of the cooking device.

In some embodiments, the malleable handle is composed, at least in part, of a heat resistant material.

In some embodiments, the outer surface deforms to conform to the shape of the user's hand.

In some embodiments, the inner surface deforms and conforms to the shape of the existing handle of the cooking device.

In some embodiments, the outer surface comprises one or more portions composed of a first material having a first degree of malleability.

In some embodiments, the outer surface comprises one or more other portions composed of a second material having a second degree of malleability.

In some embodiments, the inner surface comprises one or more portions composed of a first material having a first degree of malleability.

In some embodiments, the inner surface comprises one or more other portions composed of a second material having a second degree of malleability.

In some embodiments, the outer surface, prior to use, has a default shape state, the default shape state comprising at least one convex shaped portion of the malleable handle and at least one concave shaped portion of the malleable handle.

In some embodiments, the malleable handle further comprises a decorative element operatively connected to or integral to the malleable handle.

In some embodiments, the cooking device comprises a bladed or pointed utensil.

In some embodiments, the malleable handle further comprises a guard adapted to cover at least a portion of the bladed or pointed utensil.

In some embodiments, the guard is tethered to one of a handguard operatively connected to or integral to the malleable handle or a portion of the malleable handle.

In some embodiments, the inner surface comprises one or more malleable elements adapted to provide frictional engagement of the malleable handle with the cooking device.

In accordance with another embodiment, a cooking device comprises a body portion, and a handle portion. The handle portion comprises an outer surface that upon use conforms to a user's hand to provide an ergonomically-shaped handle with which to manipulate the cooking device.

In some embodiments, the cooking device further comprising a handguard, the handguard being positioned between the user's hand and the body portion of the cooking device during use.

In some embodiments, the cooking device further comprises a decorative element connected to or integral to the handle portion of the cooking device.

In some embodiments, the handle portion of the cooking device comprises at least one of malleable and heat-resistant material.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. The drawings are for the purpose of illustration and description only and are not intended as a definition of the limits of the invention.

The figures are not intended to be exhaustive or to limit the invention to the precise form disclosed. It should be understood that the invention may be practiced with modification and alteration, and that the disclosed technology be limited only by the claims and the equivalents thereof.

DETAILED DESCRIPTION

As alluded to above, there are situations where kitchenware, utensils, cutlery, and the like would benefit from ergonomic handles. That is, the shape of ergonomic handles can assist in proper hand positioning of a user, and/or may include recesses for proper finger positioning. Other cookware includes handles that are formed into a large, barrel-like shape to allow users with smaller hands, e.g., children, to more securely and easily grasp and hold the cookware. While ergonomic handles exist, conventional ergonomic handles are still a "one-size-fits all" attempt at solving the problem of making it easier to manipulate cookware.

Accordingly, various embodiments are directed to handles used with cookware that are malleable, the malleability allowing for ergonomic shaping or configuring of the handles in a personalized manner for each particular user that uses the cookware. It should be understood that the term cookware, cooking tool, cooking device, or other reference to a cooking implement can be used interchangeably, and can refer to any type of cooking or eating tool or utensil, cutlery, or any type of cookware having a handle or some mechanism for holding/handling the cookware. Moreover, although various embodiments disclosed herein are directed to cooking implements, embodiments can be adapted to and used with other non-cooking-related tools, implements, etc. It should be further understood that different shapes, forms, levels of conformance, etc. can result in different ergonomic characteristics and/or levels of malleability.

In some embodiments, the malleable handle may be integral to an item of cookware. For example, a cook pot may be manufactured to have the malleable handle. In some embodiments, the malleable handle may be a stand-alone device that can be added to and used with a particular piece of cookware. For example, a malleable handle may be configured to attach to an existing piece of cookware, e.g., the malleable handle may slip over or onto a handle(s) of the existing piece of cookware. In some embodiments, the malleable handle may be used interchangeably with different items of cookware, for example, a single malleable handle may be configured for use with a knife, a pot handle, etc. In still other embodiments, the single malleable handle may be malleable on the outer surface (the surface by which the user grasps the malleable handle, as well as on the inner surface (the surface that contacts the handle(s) of the existing cookware. That is, in order to be used interchangeably with different items of cookware, the inner surface of the malleable handle may also conform to the shape of a handle(s) in order to effectuate a secure connection to the handle(s). Still other embodiments may include one or more decorative elements or aspects. For example, in some embodiments, the malleable handle may include three dimensional (3D) representations of popular cartoon characters, flowers, etc., while in accordance with other embodiments, the one or more decorative elements or aspects may be revealed when the malleable handle adjusts (e.g., compresses) to conform to a user's hand(s), fingers, etc.

In the following detailed description, numerous specific details are set forth to provide a full understanding of various aspects of the present disclosure. It will be apparent, however, to one of ordinary skill in the art that various aspects of the present disclosure may be practiced without some of these specific details. In other instances, well-known structures and techniques have not been shown in detail to avoid unnecessarily obscuring the present disclosure.

Cooking may encompass all aspects of food preparation including, but not limited to, baking, grilling, sautéing, chopping, marinating, and/or mixing. Cooking may be accomplished by using cookware or one or more cooking devices/utensils. Examples of cooking devices include, but are not limited to a knife, a spoon, a fork, a pot, a pan, a griddle, a rolling pin, a whisk, a spatula, a peeler and/or other cooking tools.

Figure 1A:
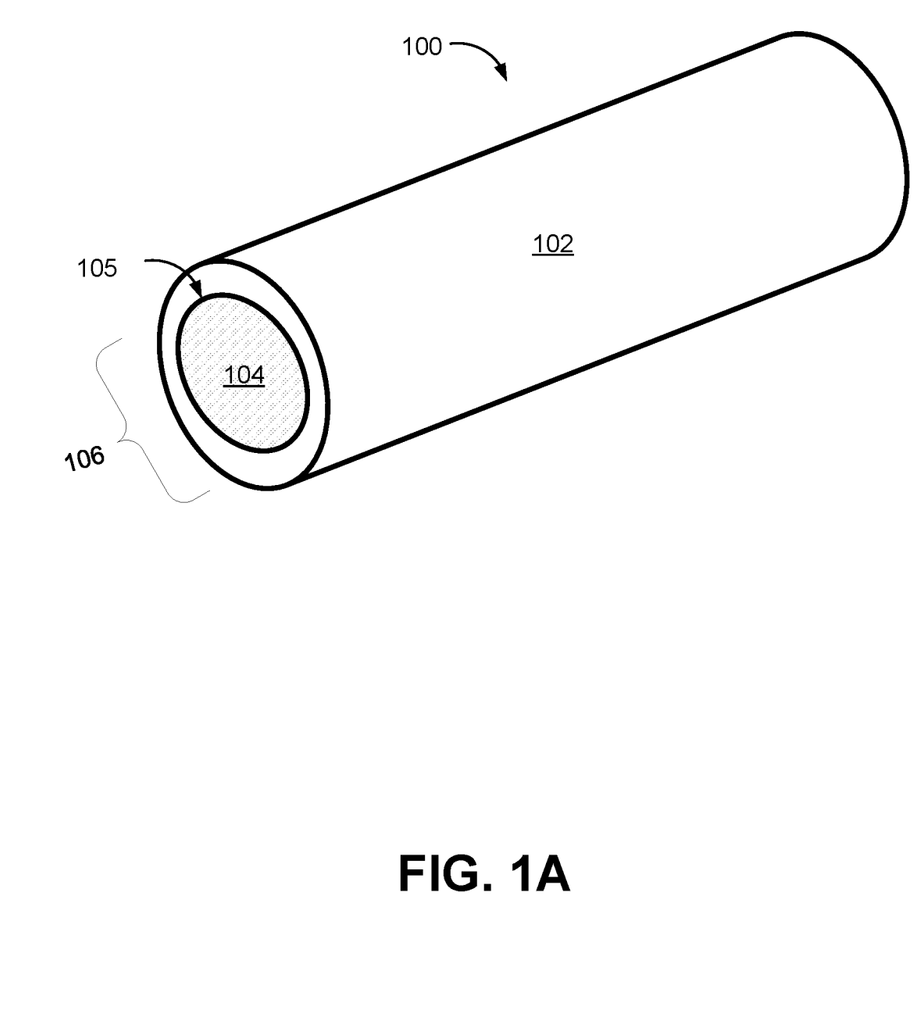
FIG. 1A illustrates an example malleable handle in accordance with one embodiment for use in conjunction with a cooking device.

FIG. 1A is a perspective view of an example malleable handle 100 for use in connection with a cooking device. In some embodiments, malleable handle 100 may comprise an outer surface 102, an inner surface 104, an opening 106, and/or other elements, such as the aforementioned decorative elements (not shown), other elements to facilitate manipulation or use of malleable handle 100 such as hand guards (not shown), etc.

Figure 1B:
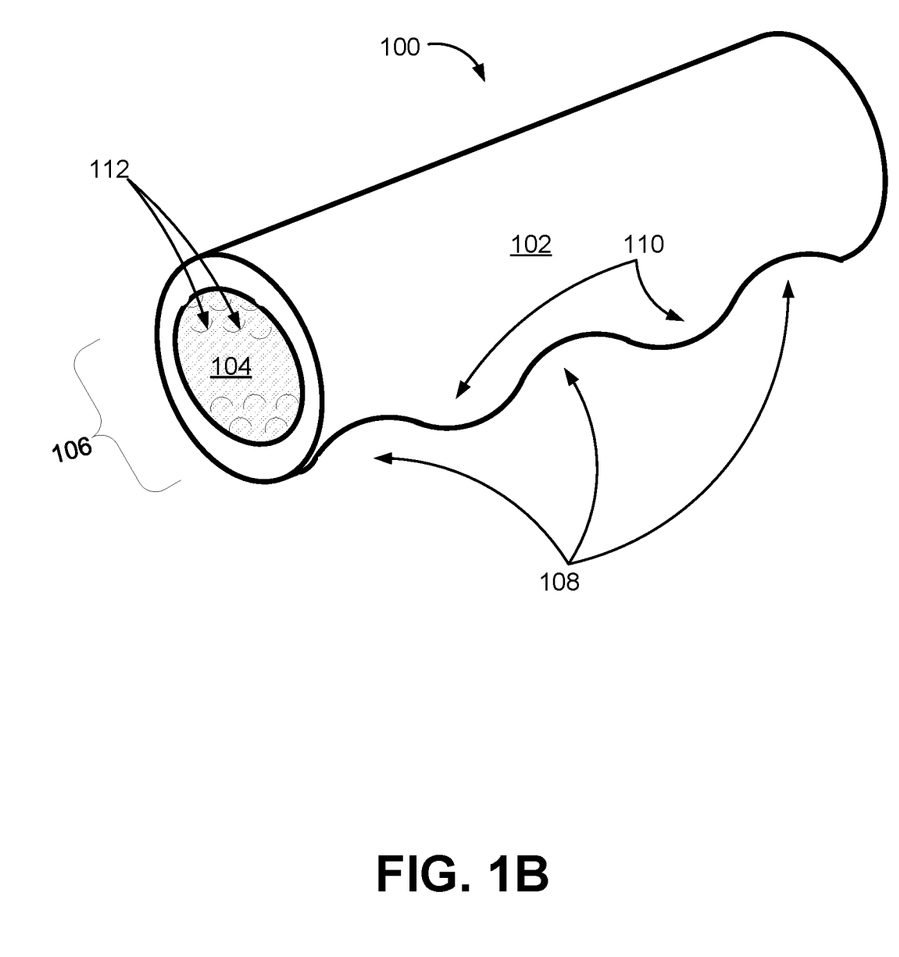
FIG. 1B illustrates another example of a malleable handle configured in accordance with one embodiment for use in conjunction with a cooking device.

In some embodiments, outer surface 102 may be generally cylindrical in shape and malleable. In some embodiments, as illustrated in FIG. 1B, outer surface 102 may be contoured or shaped in some way to facilitate conformance to a user's hand(s). For example, outer surface 102 may have ridges, protrusions, cutouts, and/or other contour/shape features. The outer surface 102 may be made out of a variety of malleable materials, such as nylon, foam, plastic, elastometric polymer, and/or other malleable materials. The overall size (e.g., thickness/girth, length, or other dimension(s) of malleable handle 100, the size of outer surface 102, the size of inner surface 104, and/or the size of opening 106 can vary amongst different embodiments.

The malleability of such materials may make malleable handle 100 fit a particular user's grip and/or may allow easy transition between users with varying hand sizes. The outer surface 102 may be made out of a malleable material that may instantaneously conform to a user's grip upon contact, and retain the indentation or other form of a user's grip over time. In some embodiments, outer surface 102 may be permanently molded into a contoured shape, for instance by using heat and/or pressure, and/or have other form fitting characteristics.

In some embodiments, multiple materials (one or more of which may be malleable) may be used for outer surface 102. For example, concave areas 108 may be made of one or more malleable materials to allow a user's finger(s) to compress the one or more malleable materials in a shape that conforms to the user's finger(s). For example, convex areas 110 may be made of one or more malleable materials that are less malleable than that/those utilized for concave areas 108. In this way, a default or base ergonomic configuration may be established upon manufacturing malleable handle 100, where further customization may be effectuated upon handling by a user.

In some implementations, an inner surface 104 of malleable handle 100 may be the cylindrical, malleable and contoured. The inner surface 104 may be made out of a variety of materials, such as nylon, foam, a soft plastic, and/or other malleable materials, or a combination of materials. In some embodiments, the material(s) used for manufacturing inner surface 104 may be the same or different from that used for the manufacturing of outer surface 102. Regarding inner surface 104, the malleability of the material(s) used to manufacture/configure inner surface 104 may allow inner surface 104 to form a secure fit over handles already present on cooking devices and/or allow for ease of transition between handles of cooking devices having different shapes and sizes. It should be understood that the term "secure" as used herein is meant to suggest a level of attachment that allows a user to be able to manipulate a cooking device without movement or slippage of malleable handle 100 to a degree that would negatively impact its usage, e.g., an effective amount of retention. However, as one of ordinary skill in the art reading this document will recognize, perfection cannot always be achieved. Accordingly, these terms can also encompass achieving performance as good or effective as possible or practical under the given circumstances.

The inner surface 104 may instantaneously conform to a cooking device's shape upon attachment, form to a particular cooking device over time and retain indentation, be able to be permanently molded into a contoured shape, for instance by using heat and pressure, and/or have other form fitting characteristics. It should be understood that inner surface 104 may comprise a substantially smooth surface, or inner surface 104 may comprise a surface having one or more protrusions, indentations, and/or other surface features 112 (shown in FIG. 1B) adapted to facilitate the aforementioned secure fit. For example, such surface features 112 may provide added friction to maintain malleable handle 100's position on/over the handle of a cooking device.

In some embodiments, the area(s) where inner surface 104 and outer surface 102 meet or join (shown as 105 in FIG. 1A) may be another component, such as a base/core upon which outer surface 102 and inner surface 104 are attached. In some embodiments, base/core 105 may be rigid (or at least more rigid that the malleable elements of malleable handle 100) in order to provide structural support for outer surface 102 and/or inner surface 104. Various materials may be used for base/core 105, for example, but not limited to, e.g., metallic materials, plastic materials, wood, or some combination thereof.

In some embodiments, malleable handle 100 may comprise solely outer surface 102 and inner surface 104, where outer surface 102 and inner surface 104 are joined directly to each other. In some embodiments, no rigid support is needed, e.g., malleable handle 100 may rely on the rigidity of the handle to which it attaches to provide structural support. In some embodiments, the aforementioned areas of malleable handle 100 that are less malleable (convex portions 110) may provide structural support.

In some embodiments, malleable handle 100 may comprise an opening 106 configured to receive a handle of a cooking device. The opening 106 may have an oval shape, a circular shape, or any other shape that allows handle 100 to be slipped on or over a cooking device handle. In this way, the outer surface of such a cooking device handle can engage inner surface 104 to achieve the aforementioned secure fit. Moreover, opening 104 may vary in diameter to accommodate different sizes and shapes of handles of cooking devices.

Figure 2:
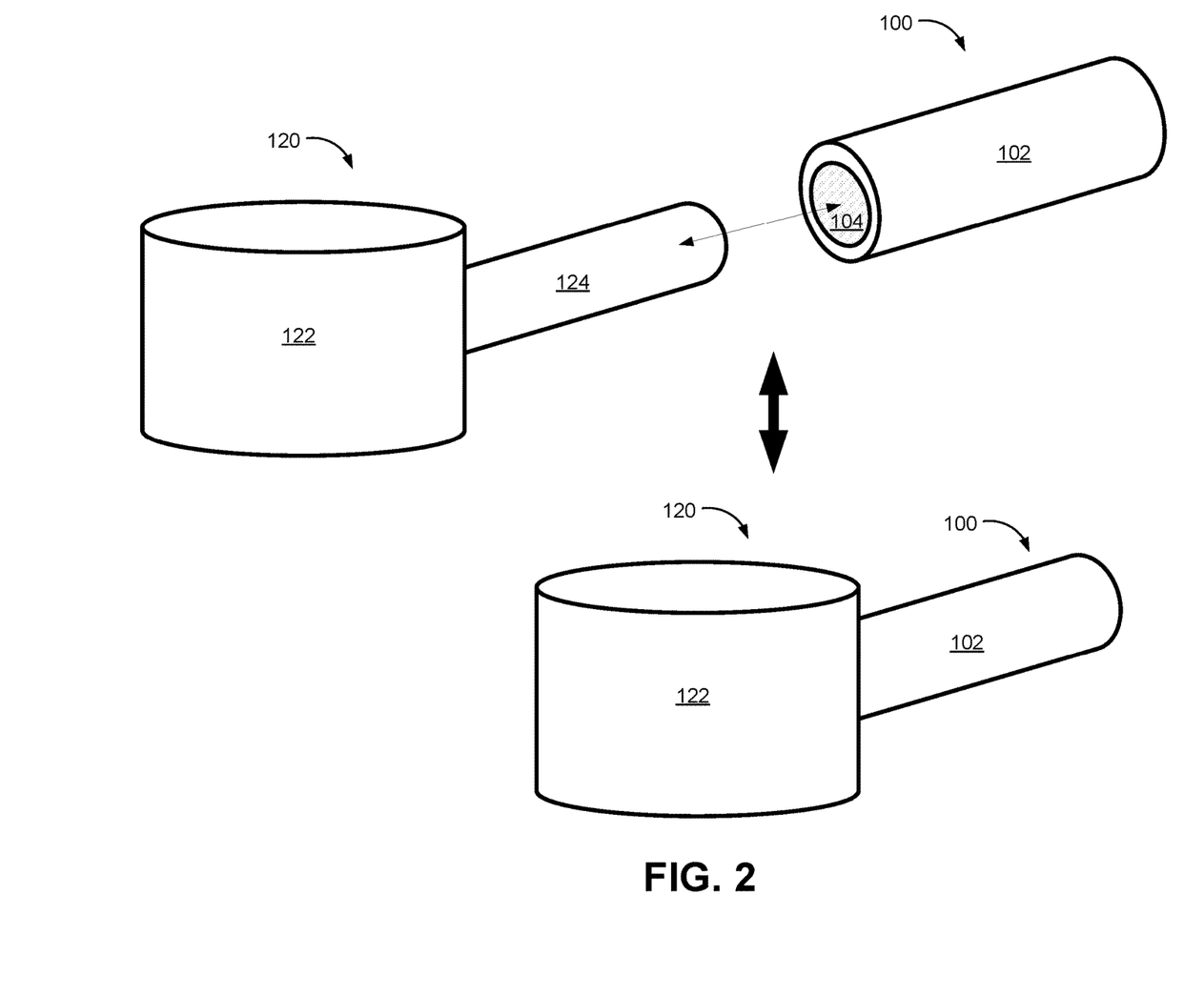
FIG. 2 illustrates a method of attaching a malleable handle to a cooking device in accordance with one embodiment.

FIG. 2 illustrates an example scenario in which an embodiment of malleable handle 100 is attached to a cooking device 120. In particular, cooking device 120 may be a pot, pan, or similar cooking device that includes a body 122 and a handle 124. Malleable handle 100 may be fitted over handle 124 by pushing or sliding handle 124 of cooking device 120 into opening 106 (see FIGS. 1A, 1B) of malleable handle 100.

As alluded to above, and in accordance with some embodiments, malleable handle 100 may designed or configured in different sizes and/or shapes to be used with various cooking devices. Malleable handle 100 may be removable, or permanently or semi-permanently secured to the cooking device 120. For example, heat, pressure, and/or some other method of setting inner surface 104 onto handle 124 of cooking device 120 may be used to securely attach malleable handle 100 to handle 124 of cooking device 120. In some embodiments, malleable handle 100 may be secured to handle 124 of cooking device 120 using screws, a latch, permanent/semi-permanent/removable adhesive, and/or other attachment or fastening mechanism(s).

Figure 3:
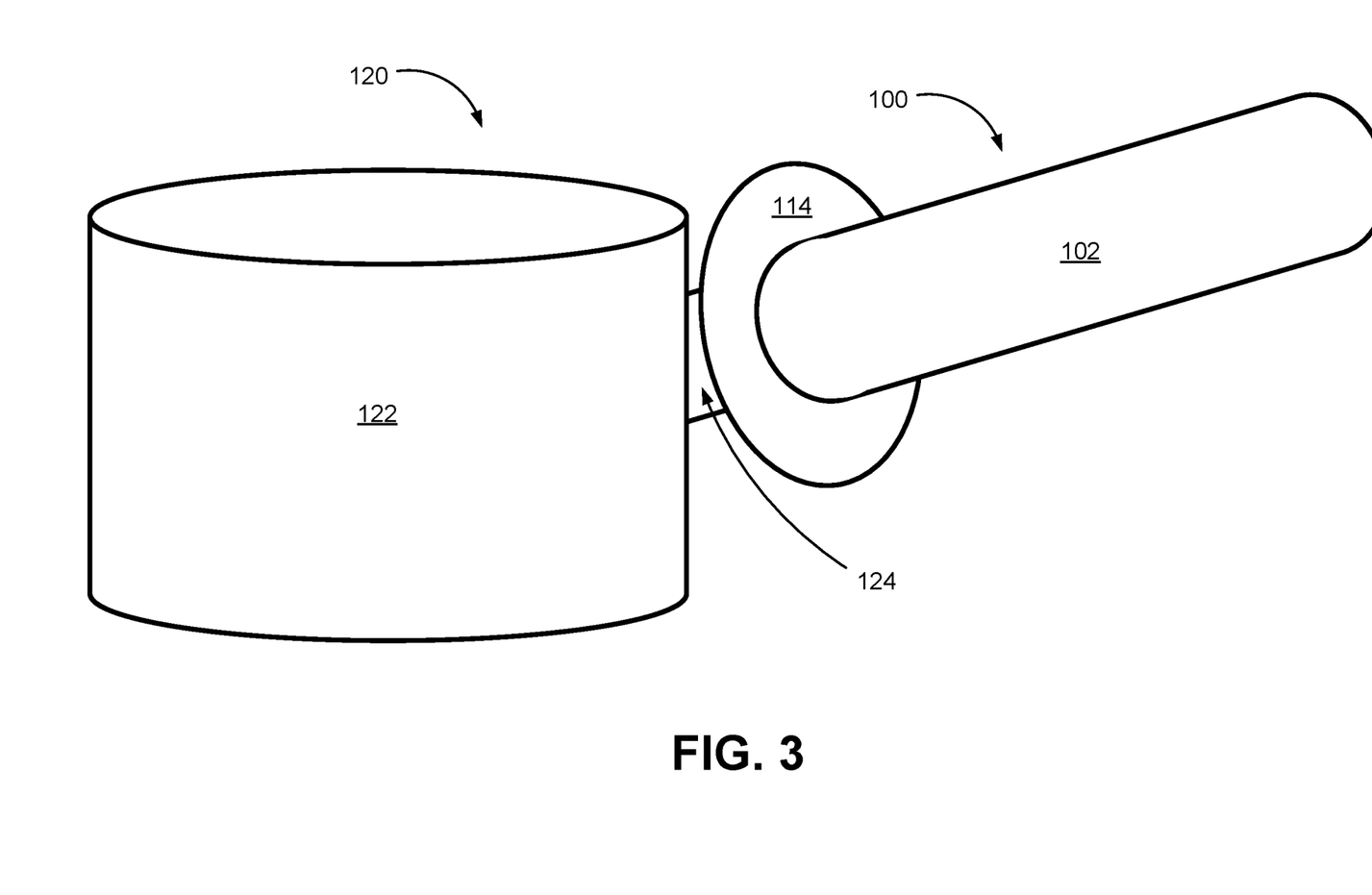
FIG. 3 illustrates an example of a malleable handle configured with an integral handguard in accordance with one embodiment.

In some embodiments, malleable handle 100 include a handguard 114. The handguard 114 may be constructed out of a variety of materials, such as metal, wood, nylon, plastic, and/or any other material. In some embodiments, handguard 114 may also be made of one or more malleable materials, such as those used to manufacture malleable handle 100. The handguard 114 may be oval in shape, circular in shape, have any other shape. In some embodiments, a surface of handguard 114 that will/can contact a user's hand(s) may be malleable or permanently shaped to engage one or more portions of the user's hand(s), such as a knuckle, thumb, etc. to effectuate a more secure and ergonomic hold while providing protection. For example, handguard 114 may have a certain thickness, e.g., less than one inch, and have a circumferential width that extends, e.g., one inch beyond outer surface 102 of malleable handle 100. In some implementations, handguard 114 may be permanently attached to a first end of malleable handle 100. In some implementations, the handguard 114 may be separate, but attachable to malleable handle 100. In some embodiments, malleable handle 102 and handguard 114 may comprise one continuous piece of material.

The handguard 114 may be used to protect a user's hand or hands from sliding along malleable handle 100 while preparing food. In some embodiments, a cooking device with which malleable handle 100 may be used can be a knife, where handguard 114 may prevent a user's hand from slipping onto the knife's blade. In some embodiments, as that illustrated in FIG. 3, the cooking device 122 may be a pot, and handguard 114 may protect a user's hand from slipping towards the body 122 of cooking device 120, which could be hot, thereby preventing the user from being burned. Further to that end, handguard 114 may be made of a heat resistant or dissipating material. It should be understood that certain malleable materials, such as silicone, may also provide heat resistance. Thus, handguard 114 and malleable handle 100 may be made of the same or similar material(s).

In some embodiments, and as alluded to above, one or more of, the outer surface 102, the inner surface 104, and handguard 114 may be made out of a heat resistant material(s). In some embodiments, a certain portion(s) of one or more of outer surface 102, inner surface 104, and handguard 114 may be made out of heat resistant material(s) while other portions may not necessarily be heat resistant. Examples of heat resistant materials may include, but are not limited to silicone rubber, Kevlar, Nomex, and/or other heat resistant materials.

In some embodiments, handguard 114 may also be configured to be decorative, such as an outline or other formation representative of a cartoon character, flower, toy, or other decorative element(s). It should be understood that decorative elements may be placed, located, or incorporated in areas/positions other than that of handguard 114. In some embodiments, one or more decorative elements may be integrated into outer surface 102 of malleable handle 100 such that, e.g., conforming outer surface 102 to a user's hand may reveal a decorative element. For example, one or more images may be imprinted on outer surface 102 such that upon outer surface 102 becoming conformed or shaped to the user's hand, some subset of the one or more images appear or appear to meet to reveal the decorative element.

Figure 4:
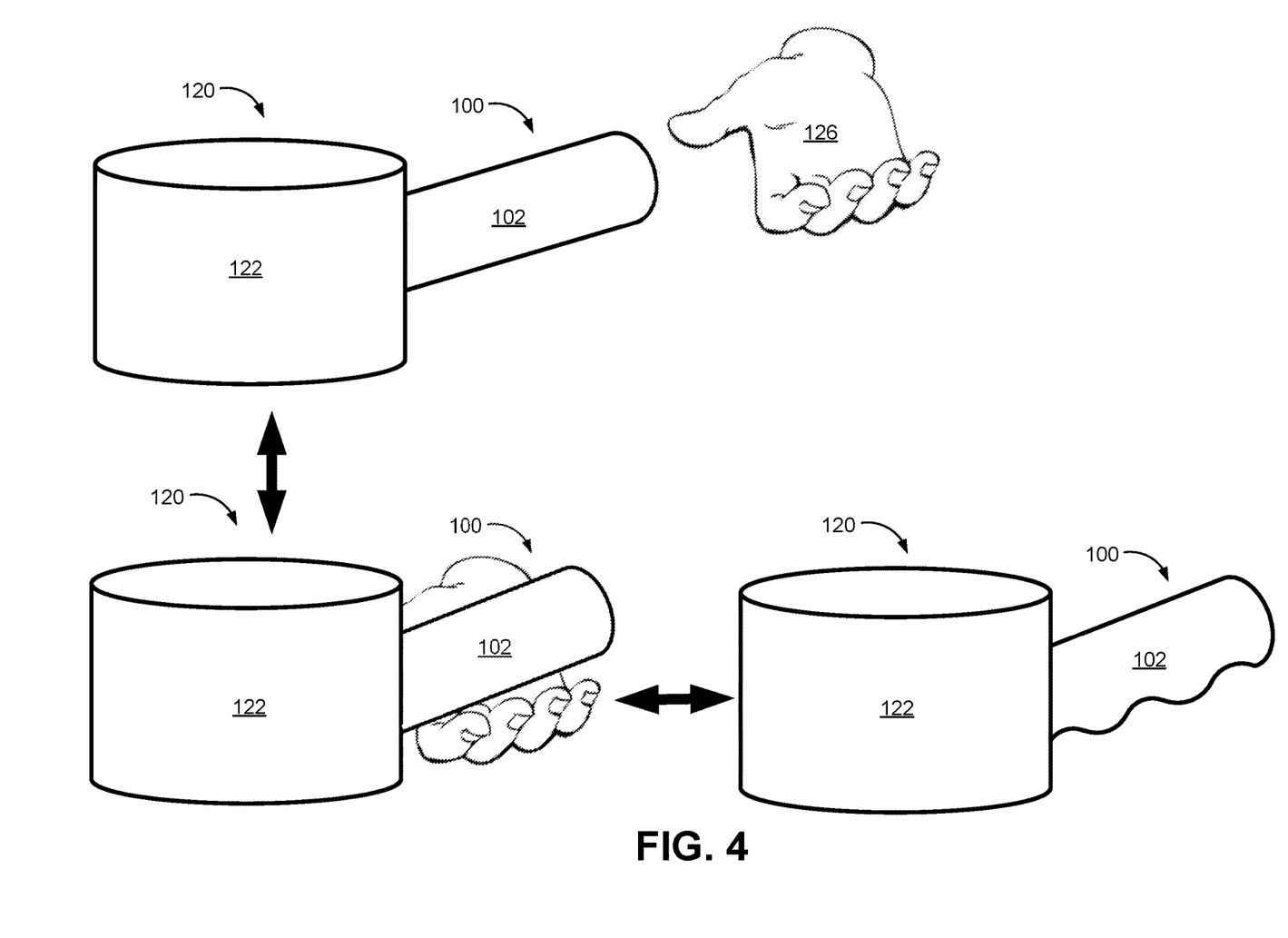
FIG. 4 illustrates a method of conforming a malleable handle to a user's hand in accordance with one embodiment.

FIG. 4 illustrates an example of malleable handle 100 in use with a cooking device (e.g., pot) 120. As illustrated in FIG. 4, malleable handle 100 is already attached to cooking device 120. That is, as described above, opening 106 of malleable handle 100 may be slid over an existing handle 124 (shown in FIG. 2) until malleable handle 100 covers the entirety of handle 124. It should be noted that malleable handle 100 need not always cover the entirety of an existing cooking device handle. However, one of ordinary skill in the art would understand that a sufficient portion of malleable handle 100 should cover the existing cooking device handle in order to achieve a secure fit, prevent slippage of malleable handle from the existing cooking device handle, and allow proper manipulation of cooking device 120 when malleable handle 100 is connected thereto.

FIG. 4 illustrates that upon attaching malleable handle 100 to cooking device 120, a user may use his/her hand 126 to grasp outer surface 102 of malleable handle 100. As noted above, the user may compress one or more sections of outer surface 102 to achieve an ergonomic fit conformant to the user's particular hand/finger(s) shape, size, level of grip strength. In some embodiments, the ergonomic conformance with hand 126 may occur immediately or at least quickly enough that the user need only grasp/compress outer surface 102 once in order to impart the shape of hand 126 to outer surface 102. In some embodiments, heat may be applied to set outer surface 102 into the desired shape conforming to hand 126. In some embodiments, outer surface 102 may set over time. The manner in which outer surface 102 is set may depend on the material(s) used to manufacture outer surface 102.

In still other embodiments, outer surface 102 may remain malleable, such that each time a user grasps malleable handle 100, outer surface 102 can be re-formed or re-shaped to be conformant to that user's hand(s). In other words, outer surface 102 may be composed of a material(s) that temporarily contours to a user's grip. After some time of non-use (again dependent upon the physical characteristics of the material(s) used to compose outer surface 102), outer surface 102 may return to its default state or shape. In FIG. 4, this default state or shape is that of a straight sided cylinder. It should be understood, however, that outer surface 102 can be configured to have other shapes/states as a default shape/state.

It should be appreciated that once outer surface 102 is made to conform with hand 126, the user will be able to grasp, manipulate, or otherwise use cooking device 120 more easily and more effectively. For example, if the user is a child, he/she may not have enough grip strength in his/her fingers to hold a straight-sided handle. However, with a contoured handle configured to fit the user's hands, the user's fingers are provided with additional support from, e.g., the resulting concave portions of outer surface 102 in which one or more fingers may fit. In some cases, the existing handle of a cooking device may be narrow. A user suffering from arthritis or other ailment may prevent the user from fully closing his/her hand around the existing (narrow) handle. Accordingly, in some embodiments, malleable handle 100 vis-à-vis outer surface 102 may provide added girth and a conformant fit that can negate or mitigate the inability of a user to fully close his/her hand(s).

It should be noted that the overall length of malleable handle 100 can vary. In some embodiments, malleable handle 100 can be made to fit (or fit as closely as possible) an existing handle of a cooking device. In this case, a user may rely on multiple versions of malleable handle 100 (having different lengths, girths, etc.) to fit different cooking devices. In some embodiments, malleable handle 100 may be configured to have a more universal fit with the handles of various cooking devices. To that end, in some embodiments, e.g., when malleable handle 100 comprises a rigid base or core, a user may choose to utilize an embodiment of malleable handle 100 whose length exceeds that of an existing cooking device handle. In this way, upon attaching malleable handle 100 to a cooking device handle, the handle of the cooking device is effectively increased, thereby providing the ability to manipulate or use the cooking device with two hands, for example, as opposed to just one.

In still other embodiments, the base/core 105 (see FIG. 1A) may be configured to accept a variety of different inserts, the inner surfaces of which embody inner surface 104. That is, in some embodiments, malleable handle 100 may be configured such that inserts having different thicknesses can be placed into base/core 105. Thus, the effective dimensions of inner surface 104 can be made to vary. In this way, existing handles of cooking devices having different sizes, e.g., girths, can be accommodated.

Figure 5A:
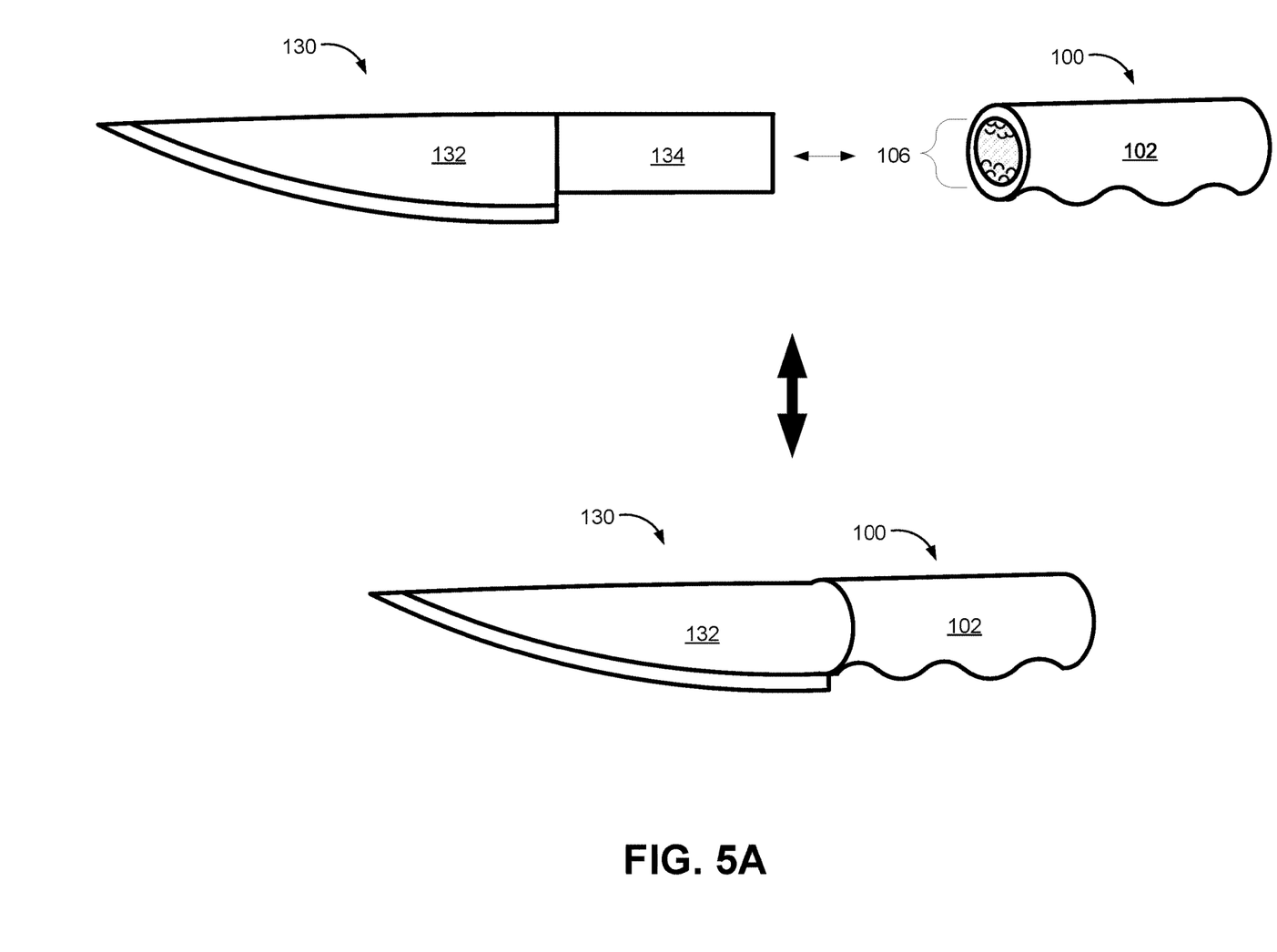
FIG. 5A illustrates an example method of attaching a malleable handle to a knife in accordance with one embodiment.

FIG. 5A illustrates an example use case scenario where malleable handle 100 may be used in conjunction with a cooking utensil, such as a knife 130 or other bladed utensil/implement or other utensil/implement having a point, sharp area(s), etc. FIG. 5A illustrates knife 130 as having a blade portion 132, and a handle portion 134. As illustrated in FIG. 5A, handle portion 134 may be relatively cylindrical (or substantially non-ergonomic) in shape. Knife 130 is only one example of a knife, and other knifes of, e.g., different sizes, weights, and/or styles are contemplated for use with malleable handle 100. For example, knife 130 may be a chopping knife, a paring knife, a steak knife, a butter knife, and/or any other type of knife used for cooking, eating, or other function. In order to achieve better control of knife 130, malleable handle 100 may be attached over handle portion 134.

Figure 5B:
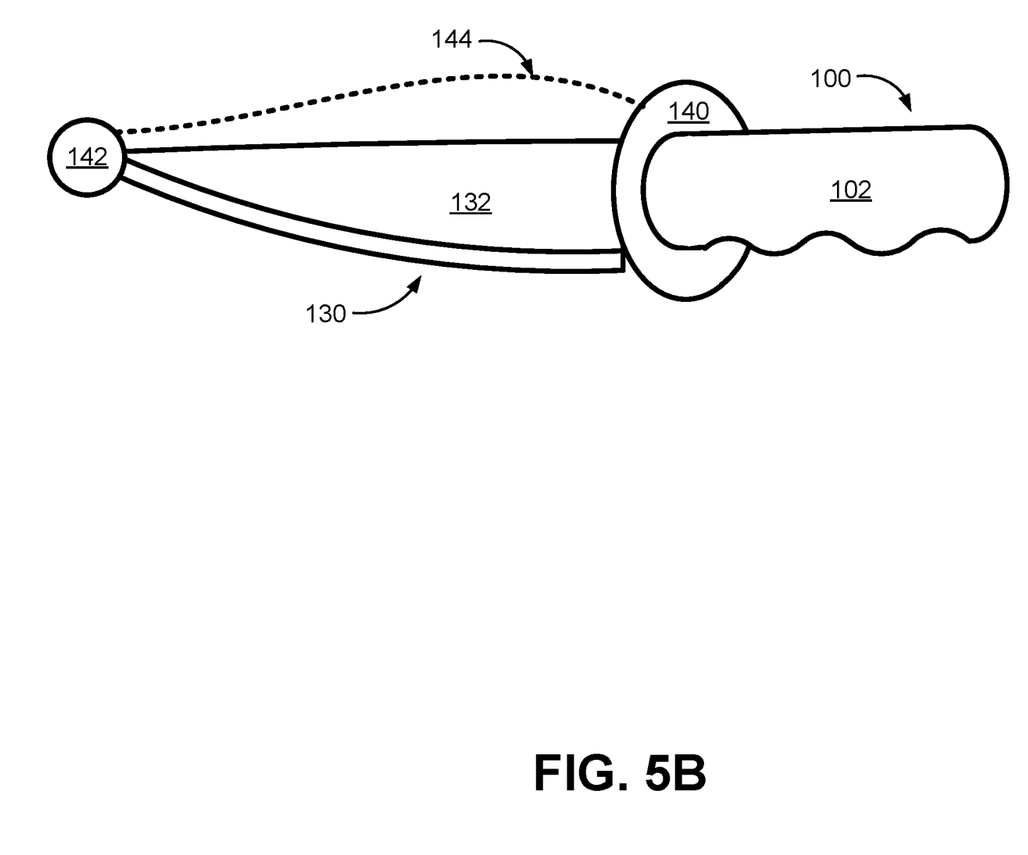
FIG. 5B illustrates an example malleable handle configured with a handguard and knife guard in accordance with one embodiment.

As with previously described embodiments, one or more decorative elements or safety elements (e.g., a handguard) may be implemented as part of malleable handle 100. FIG. 5B illustrates an example embodiment, where malleable handle 100 may include a handguard 140. Handguard 140 may be another embodiment of handguard 114, and may have the same/similar properties, and may be composed of the same or a similar material(s). For example, handguard 140 may have the same/a similar shape, material(s) composition, utility and/or other characteristics. In some embodiments, the handguard 140 and malleable handle 100 may be a single or integral unit. The handle portion 134 of knife 130 may be inserted into the opening 106 of malleable handle 100 (FIG. 5A). As previously described, opening 106 of malleable handle 100 may be of various shapes or sizes in order to accommodate a variety of cooking devices.

In accordance with still another embodiment, as illustrated in FIG. 5B, malleable handle 100 may include a knife guard 142, where knife guard 142 is tethered or otherwise attached to handguard 140 (or some other portion of malleable handle 100). The manner in which knife guard 142 is tethered to handguard 140/other portion of malleable handle 100 may comprise a string, chain, or other elongate member. Knife guard 142 may serve to protect the tip of knife 130 from being blunted or broken off, e.g., if knife 130 were to be dropped or other mishandled. Moreover, knife guard 142 may serve to protect the user from stabbing/poking him/herself or another person with the tip portion of knife 130. Tethering knife guard 142 to handguard 140 or malleable handle 100 can prevent knife guard 142 from being lost or otherwise misplaced.

In some embodiments, knife guard 142 may be ball-shaped with a slot that may fit over the tip of knife 130. However, it should be understood that knife guard 142 may be configured in a variety of other shapes, and may be configured to have different sizes for use with larger/smaller knives. For example, a larger knife guard 142 may be used for a malleable handle 100 intended for use by children. Like handguard 142 (and 114), knife guard 142 may also be shaped or composed into some decorative element. In some embodiments, knife guard 142 may comprise multiple layers of materials. In some embodiments, the knife guard 142 may have a rigid inner layer made of material(s) including, but not limited to plastic, kydex, vulcanized rubber, or other material(s) that contain the tip of knife 142.

In some embodiments, knife guard 142 may be shaped to allow knife guard 142 to be used as a cutting anchor. That is, a user may grasp knife guard 142 or put pressure on knife guard 142 with the user's non-holding hand to facilitate chopping of food or other items. in other words, a user may grip the knife guard 142 in one hand and malleable handle 100 in the other hand to minimize the risk of losing control of the knife while chopping. A user may grip the knife guard 142 and hold it steady against a rigid surface such as a cutting board or table. While the knife 130 is inserted into the knife guard 142, the user may grip malleable handle 100, and move it up and down to chop a food item.

While some implementations of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions. Additionally, with regard to flow diagrams, operational descriptions and method claims, the order in which the steps are presented herein shall not mandate that various implementations be implemented to perform the recited functionality in the same order unless the context dictates otherwise.

Although the disclosed technology is described above in terms of various exemplary implementations and implementations, it should be understood that the various features, aspects and functionality described in one or more of the individual implementations are not limited in their applicability to the particular implementation with which they are described, but instead can be applied, alone or in various combinations, to one or more of the other implementations of the disclosed technology, whether or not such implementations are described and whether or not such features are presented as being a part of a described implementation. Thus, the breadth and scope of the technology disclosed herein should not be limited by any of the above-described exemplary implementations.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

What is claimed is:

1. A malleable handle for use in conjunction with a cooking device comprising:
   an outer surface that upon use conforms to a user's hand to provide an ergonomically-shaped handle with which to manipulate the cooking device, wherein the outer surface comprises multiple convex shaped portions alternating with multiple concave shaped portions along a longitudinal axis of the handle, wherein the convex shaped portions are less malleable than the concave shaped portions, and wherein each concave shaped portion is configured to conform to the user's grip by an indentation of the user's grip formed at the concave shaped portion upon contact of the user's hand with the concave shaped portion, and the concave shaped portions is configured to retain the indentation of the user's grip over time; and
   an inner surface adapted to engagingly connect the handle to an existing handle of the cooking device, the inner surface defining an opening for accepting the existing handle of the cooking device;
   wherein the outer surface, prior to use, has a default shape state, the default shape state comprising at least one of the convex shaped portions of the malleable handle and at least one of the concave shaped portions of the malleable handle.

2. The malleable handle of claim 1, further comprising a handguard, the handguard being positioned between the user's hand and the cooking device during use.

3. The malleable handle of claim 1, wherein the malleable handle further comprises at least one of:
   a removable handle; or
   a handle re-attachable to the existing handle of the cooking device.

4. The malleable handle of claim 1, wherein the malleable handle is composed, at least in part, of a heat resistant material.

5. The malleable handle of claim 1, wherein the inner surface deforms and conforms to the shape of the existing handle of the cooking device.

6. The malleable handle of claim 1, wherein the inner surface comprises one or more portions composed of a first material having a first degree of malleability.

7. The malleable handle of claim 6, wherein the inner surface comprises one or more other portions composed of a second material having a second degree of malleability.

8. The malleable handle of claim 1, further comprising a decorative element operatively connected to or integral to the malleable handle, such that the decorative element is revealed when the malleable handle conforms to the user's grip.

9. The malleable handle of claim 1, wherein the cooking device comprises a bladed or pointed utensil.

10. The malleable handle of claim 9, wherein the malleable handle further comprises a guard adapted to cover at least a portion of the bladed or pointed utensil.

11. The malleable handle of claim 10, wherein the guard is tethered to one of a handguard operatively connected to or integral to the malleable handle or a portion of the malleable handle.

12. The malleable handle of claim 1, wherein the inner surface comprises one or more malleable elements adapted to provide frictional engagement of the malleable handle with the existing handle of the cooking device.

13. A cooking device, comprising:
a body portion; and
a handle portion;
wherein the handle portion comprises:
a malleable outer surface that upon use conforms to a user's hand to provide an ergonomically-shaped handle with which to manipulate the cooking device, the malleable outer surface comprising multiple convex shaped portions alternating with multiple concave shaped portions along a longitudinal axis of the handle, wherein the convex shaped portions are less malleable than the concave shaped portions; and
wherein the malleable outer surface, prior to use, has a default shape state, the default shape state comprising at least one of the convex shaped portions of the handle portion and at least one of the concave shaped portions of the handle portion.

14. The cooking device of claim 13, further comprising a handguard, the handguard being positioned between the user's hand and the body portion of the cooking device during use.

15. The cooking device of claim 13, wherein the handle portion of the cooking device comprises a heat-resistant material.

16. The cooking device of claim 13, wherein the handle portion further comprises at least one of:
a removable handle; or
a handle re-attachable to an existing handle of the cooking device.

17. The cooking device of claim 13, wherein an inner surface of the handle portion deforms and conforms to the shape of the existing handle of the cooking device.

* * * * *